United States Patent [19]

Carlson

[11] Patent Number: 4,474,047
[45] Date of Patent: Oct. 2, 1984

[54] METHOD AND APPARATUS FOR INHERENT ROTARY JOINT CALIBRATION

[75] Inventor: Donald E. Carlson, Austin, Tex.

[73] Assignee: Texas Instruments Incorporated, Dallas, Tex.

[21] Appl. No.: 355,286

[22] Filed: Mar. 5, 1982

[51] Int. Cl.³ .............................................. G01C 1/00
[52] U.S. Cl. ..................................... 73/1 E; 33/1 PT
[58] Field of Search ....... 33/1 N, 1 PT, 1 R, 174 TB, 33/174 TD, 1 MP, 1 CC, 1 D, 1 H; 324/158 E, 324/71.1; 73/1 E

[56] References Cited

U.S. PATENT DOCUMENTS

| | | | |
|---|---|---|---|
| 2,804,594 | 8/1957 | Bjong et al. | 73/1 E X |
| 2,811,692 | 10/1957 | Ebbs et al. | 73/1 E X |
| 2,906,179 | 9/1959 | Bower | 33/1 CC X |
| 3,346,724 | 10/1967 | Fuhrmeister et al. | 33/1 MP X |
| 3,887,202 | 6/1975 | Zapart | 33/1 D |
| 4,249,314 | 2/1981 | Beck | 33/1 H |

*Primary Examiner*—William D. Martin, Jr.
*Attorney, Agent, or Firm*—Thomas G. Devine; Leo N. Heiting; Melvin Sharp

[57] ABSTRACT

A manipulator having at least two segments, rotatable with respect to each other, measures the angle formed therebetween and is self calibrating to insure the accuracy of the measurement. An electrical resolver is employed, with its rotor attached to one of the segments and stator attached to the other, with the rotor and stator slotted, in registration, at a relative position indicating electrical zero. Each segment has a pin formed on it positioned to engage the slots in the rotor and stator at a mechanical zero degrees output, insuring a zero degrees mechanical output for zero volts electrical output.

10 Claims, 2 Drawing Figures

METHOD AND APPARATUS FOR INHERENT ROTARY JOINT CALIBRATION

BACKGROUND OF THE INVENTION

1 Field of the Invention

This invention relates to self calibration of an angle measuring apparatus for measuring the angle between two rotably mounted members. More particularly, it relates to self calibration of the measuring apparatus for measuring the angle between segments of a manipulator such as an articulated robot.

2 Description of the Prior Art

One prior art method of calibration is to position the segments of an articulated robot vertically. This is done visually and is quite inaccurate, being totally operator dependent. Any perceived deviation must be recorded and future readings compensated by the deviation.

Another method is to use bubble levels to place the robot members in either a horizontal or vertical position. Other positions may be achieved using a protractor equipped level. This method is subject to inaccuracies in the leveling surface on the robot, the accuracy of the level itself and the operator's skill.

A third method is to place alignment marks on adjacent surfaces of the segments of a robot and to visually align these marks. This method is subject to operator error in aligning the marks visually. Also, the width of the marks is a limiting factor in the possible resolution. Further, a manufacturing error associated with placing these marks on the joint members is also a source of error.

The present invention overcomes the drawbacks of these prior art methods described.

BRIEF SUMMARY OF THE INVENTION

A manipulator, such as an articulated robot, measures its rotary joints with electrical resolvers. The rotor of the resolver is fastened to one segment of the rotary joint and the stator is attached to the other segment of the rotary joint. With the stator and rotor positioned to produce an electrical zero output, a slot is formed, in registration, in these two elements. With the two segments of the robot at mechanical zero, a pin is attached to each of the segments to engage the slot formed in the rotor and in the stator, respectively. In this manner, the correspondence of electrical zero output with mechanical zero output is assured.

The principal object of this invention therefore is to provide a manipulator with apparatus for self calibration of its rotary joint angle measuring apparatus.

This and other objects will be made evident in the detailed description that follows.

DETAILED DESCRIPTION OF THE INVENTION

Figure 1:
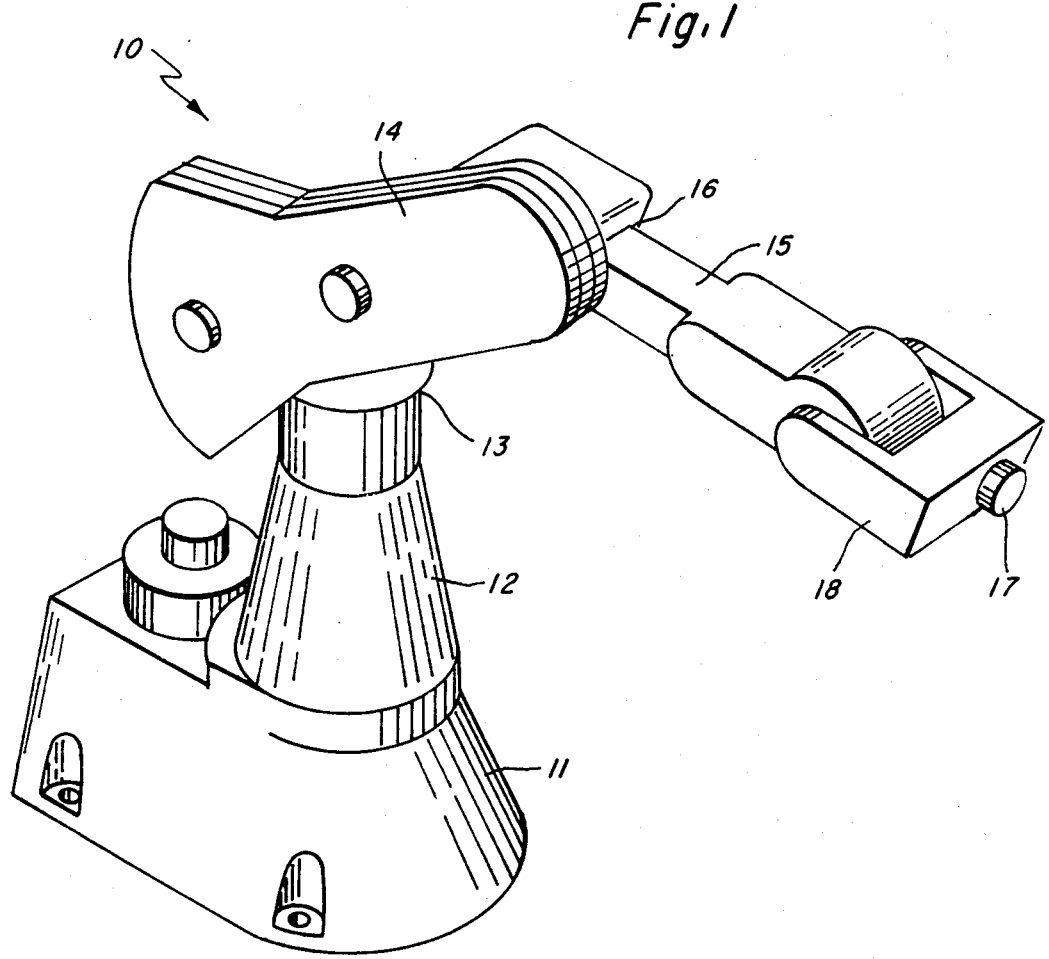
FIG. 1 illustrates the manipulator of this invention.

FIG. 1 illustrates a manipulator 10. In this preferred embodiment, the manipulator is an articulated robot for industrial use. A base 11 supports a pedestal 12 which supports upper arm 14 at rotable joint 13. Lower arm 15 rotates at joint 16 and has rotable member 18 attached thereto. Rotable member 17 is attached to a member 18. The desired tool, such as a gripper, is attached to member 17.

Figure 2:
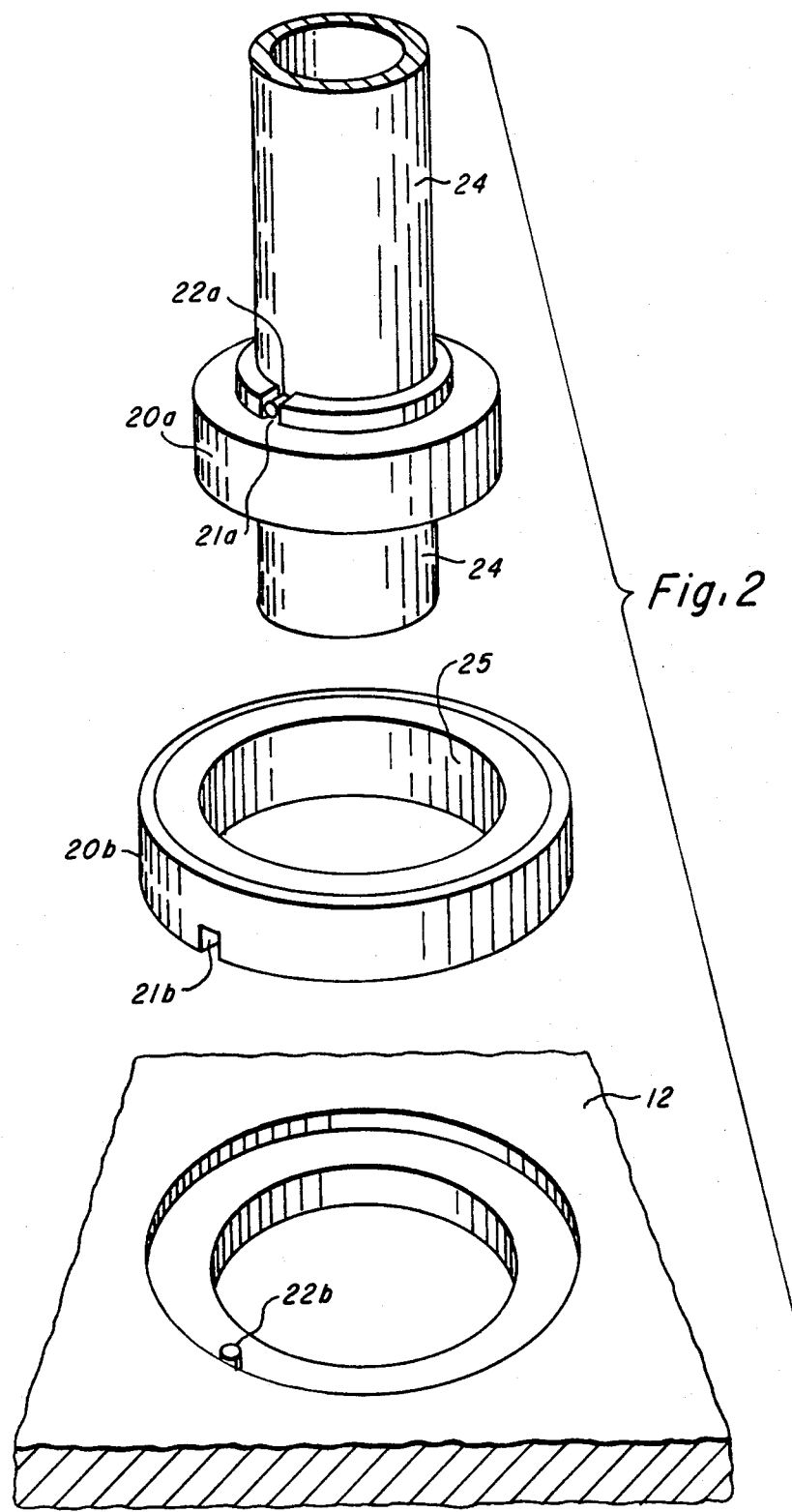
FIG. 2 illustrates, in exploded form, a rotary joint of the manipulator.

Rotatable joint 13, representative of all of the other rotatable joints of the manipulator, is described, with respect to the inherent calibration. FIG. 2 illustrates rotable member 24 to which resolver rotor 20a is affixed. Resolver stator 20b is affixed in pedestal 12. Slots 21a and 21b, formed in registration between rotor 20a and stator 20b, correspond to a zero output of the resolver. This registration could be accomplished, of course, for any other desired output from the resolver. Furthermore, while a resolver is employed in this preferred embodiment, a potentiometer could be used and encoders could be employed.

Pin 22a affixed to segment 24 engages slot 21a, and pin 22b, affixed to pedestal 12, engages slot 21b. Pins 22a and 22b are positioned to accurately reflect a zero degree output between segments 12 and 24. Of course, these pins could be positioned to provide any other desired rotational output. However, in this preferred embodiment, this mechanism positively fixes the electrical zero output with the mechanical zero degree setting between the segments. In this manner calibration is assured without reliance upon a human operator.

The user of the robot is able to take delivery of the unit, install it, and begin to use it immediately with no calibration. The accuracy is dependent upon the tolerances in machining, in the slots and in positioning the pins. Obviously, more accuracy is achieved than any of the prior art methods listed above. Of course, the method and apparatus of this invention is applicable to any application where sensors are employed to measure the angle between a pair of members. Such applications include, without limitation, machine tool systems, radar and gimbal systems.

What is claimed is:

1. A manipulator having at least first and second segments connected to measurably rotate with respect to each other, and a calibration mechanism for calibrating the measuring apparatus, comprising:
   (a) electrical sensing means having a rotor attached to the first segment and a stator attached to the second segment and having mechanical alignment means formed in the rotor and the stator, and in registration therebetween, corresponding to the predetermined electrical output;
   (b) electrical sensing engagement means having rotor locking means formed on the first segment, positioned to engage the rotor alignment means at a desired rotational position; and
   (c) electrical sensing engagement means having stator locking means formed on the second segment, positioned to mechanically engage the stator alignment means at the desired rotational position.

2. The manipulator of claim 1 wherein mechanical alignment means comprises slots, in registration, formed in the rotor and in the stator, wherein the rotor locking means comprises a pin formed on the first segment and wherein the stator locking means comprises a pin formed on the second segment.

3. The manipulator of claim 1 wherein the electrical sensing means comprises a resolver.

4. The manipulator of claim 3 wherein the electrical sensing means comprises a resolver.

5. The manipulator of claims 2, 3, 4 or 1 wherein the predetermined electrical output is zero volts and the desired rotational position is zero degrees.

6. A calibration mechanism for calibrating the apparatus for sensing the position between a first and a second segment that rotate with respect to each other, comprising:
(a) electrical sensing means having a rotor attached to the first segment and a stator attached to the second segment to permit rotary motion between the rotor and the stator, and having mechanical alignment means formed in the rotor and in the stator, and in registration therebetween, corresponding to a predetermined electrical output;
(b) rotor locking means formed on the first segment, positioned to engage the rotor alignment means at a desired rotational position; and
(c) stator locking means formed on the second segment, positioned to mechanically engage the stator alignment means at the desired rotational position, thereby fixing the predetermined electrical output with the desired rotational position.

7. The mechanism of claim 6 wherein the mechanical alignment means comprises slots, in registration, formed in the rotor and in the stator, wherein the rotor locking means comprises a pin formed on the first segment and wherein the stator locking means comprises a pin formed on the second segment.

8. The mechanism of claim 7 wherein the electrical sensing means comprises a resolver.

9. The mechanism of claim 8 wherein the electrical sensing means comprises a resolver.

10. The mechanism of claims 6, 7, 8 or 9 wherein the predetermined electrical output is zero volts and the desired rotational position is zero degrees.

* * * * *